J. C. SPOONER.
VEHICLE-AXLE.

No. 172,515.                                             Patented Jan. 18, 1876.

WITNESSES
Henry N. Miller
C. L. Evert.

INVENTOR
Jonas C. Spooner
By Alexander ___
Attorneys.

UNITED STATES PATENT OFFICE.

JONAS C. SPOONER, OF HOULTON, MAINE.

IMPROVEMENT IN VEHICLE-AXLES.

Specification forming part of Letters Patent No. 172,515, dated January 18, 1876; application filed December 3, 1875.

*To all whom it may concern:*

Be it known that I, JONAS C. SPOONER, of Houlton, in the county of Aroostook and in the State of Maine, have invented certain new and useful Improvements in Revolving Axles for Vehicles; and do hereby declare that the following is a full, clear, and exact description thereof, reference being had to the accompanying drawings and to the letters of reference marked thereon, making a part of this specification.

The nature of my invention consists in the construction and arrangement of a revolving axle for vehicles, as will be hereinafter more fully set forth.

In order to enable others skilled in the art to which my invention appertains to make and use the same, I will now proceed to describe its construction and operation, referring to the annexed drawing, in which—

Figure 1:
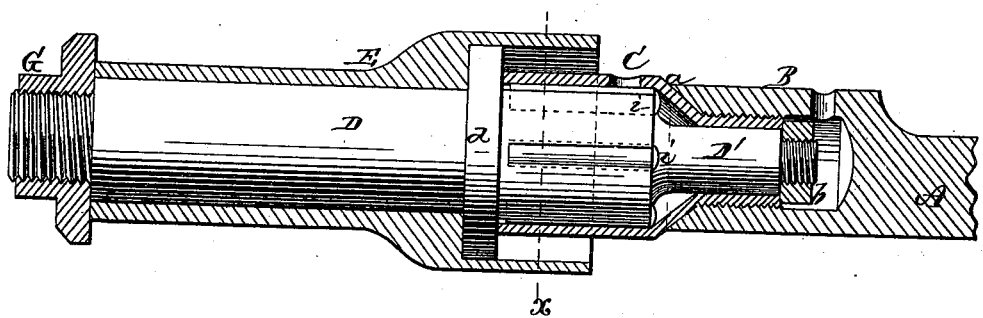
Figure 2:
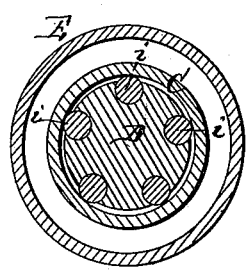

Figure 1 is a longitudinal section of my improved axle for vehicles. Fig. 2 is a cross-section of the same through the line $x\,x$, Fig. 1.

A represents the axle, in the end of which is formed a socket, B, with interior or female screw-threads, to receive the end of a box, C, screwed therein. The inner end of this box is made of suitable diameter to be screwed into the socket B, while the outer end is of larger diameter than the outside diameter of said socket. The swell or shoulder of the box C forms with the end of the socket B a tight joint at $a$. D represents the spindle, provided with the circumferential flange or collar $d$, and having its inner end inserted in the box C. On the extreme inner end of the spindle D is formed a rod or reduced part, D', which extends through the inner end of the box, and has a nut, $b$, screwed upon its end, to prevent the spindle from coming out of the box. In that portion of the spindle D which is within the enlarged part of the box C are inserted friction-rollers $i\,i$, which bear against the inner surface of said part of the box. When these parts are thus placed together the flange or collar $d$ is close up against the end of the socket $c$. On the spindle D, outside of the flange or collar $d$, is placed the box E, which is fastened, in the usual manner, in the hub of the wheel, and held fast on the spindle by a nut, G.

By this invention the draft on the team is very much lessened, because the wheel is rolled by the horse from the outside, and the center, being fast in and rolled by the wheel, moves the load forward, and each wheel is a positive mover, the power of which is increased by the speed of the horse, instead of being moved forward by the center, and revolving around that center with the friction of the load on the under side of the axle; whereas by my invention the friction is transferred to the upper side and the rollers relieve the friction, thereby giving the load in the carriage under speed the propelling power in passing over obstructions.

Having thus fully described my invention, what I claim as new, and desire to secure by Letters Patent, is—

1. The combination of the axle A, formed with a screw-socket, B, at its end, and the box C, screwed into said socket, and forming a tight joint, $a$, therewith, substantially as herein set forth.

2. The combination of the box C, spindle D, having reduced part D', the friction-rollers $i\,i$, and nut $b$, substantially as and for the purposes herein set forth.

3. The combination of the axle A, with socket B in its end, the box C, spindle D, with flange $d$ and rollers $i\,i$, the box E, and nut G, all constructed substantially as and for the purposes herein set forth.

In testimony that I claim the foregoing I have hereunto set my hand this 8th day of November, 1875.

JONAS C. SPOONER.

Witnesses:
ROYAL S. CLOUGH,
ALBERT W. MADIGAN.